United States Patent
Biswas

(10) Patent No.: US 10,402,954 B2
(45) Date of Patent: Sep. 3, 2019

(54) HISTOGRAM-BASED SHAPE MAPPING FOR PROPAGATING CHANGES ACROSS SIMILAR SHAPES IN MULTIPLE ARTBOARDS

(71) Applicant: Adobe Inc., San Jose, CA (US)

(72) Inventor: Sanjeev Kumar Biswas, Kolkatta (IN)

(73) Assignee: Adobe Inc., San Jose, CA (US)

( * ) Notice: Subject to any disclaimer, the term of this patent is extended or adjusted under 35 U.S.C. 154(b) by 57 days.

(21) Appl. No.: 15/794,218

(22) Filed: Oct. 26, 2017

(65) Prior Publication Data
US 2019/0130548 A1    May 2, 2019

(51) Int. Cl.
  *G06T 5/40* (2006.01)
  *G06T 7/60* (2017.01)
  *G06T 3/40* (2006.01)

(52) U.S. Cl.
  CPC .......... *G06T 5/40* (2013.01); *G06T 3/40* (2013.01); *G06T 7/60* (2013.01)

(58) Field of Classification Search
  CPC ..................................... G06T 5/40; G06T 3/40
  See application file for complete search history.

(56) References Cited

U.S. PATENT DOCUMENTS

| 8,285,055 B1* | 10/2012 | Barnes | G06T 7/337 |
| | | | 382/108 |
| 2015/0002541 A1* | 1/2015 | Dillavou | G06T 19/006 |
| | | | 345/633 |

OTHER PUBLICATIONS

Gogia, Sumit, "Insight: Interactive Machine Learning for Complex Graphics Selection", Massachusetts Institute of Technology, Department of Electrical Engineering and Computer Science, May 20, 2016, 89 pages.

* cited by examiner

*Primary Examiner* — Ryan R Yang
(74) *Attorney, Agent, or Firm* — Kilpatrick Townsend & Stockton LLP

(57) ABSTRACT

Disclosed systems and methods perform histogram-based shape mapping for propagating changes across similar shapes in multiple artboards. An image processing application executed by one or more processing devices accesses a first shape to be displayed in a master artboard and a second shape to be displayed in a child artboard. The image processing application computes a first histogram for the first shape and a second histogram for the second shape. The image processing application maps the first shape to the second shape based on a level of similarity between the first and second histograms. The image processing application detects a change to the first shape in the master artboard. The image processing application propagates the change to the second shape in the child artboard based on the first shape being mapped to the second shape.

20 Claims, 11 Drawing Sheets

500

HISTOGRAM-BASED SHAPE MAPPING FOR PROPAGATING CHANGES ACROSS SIMILAR SHAPES IN MULTIPLE ARTBOARDS

TECHNICAL FIELD

This disclosure relates generally to image processing. More specifically, but not by way of limitation, this disclosure relates to propagating changes made to shapes on one electronic artboard to another electronic artboard.

BACKGROUND

Working on a graphic design project often involves creating multiple electronic artboards. For example, a designer could create different artboards for online content and print content, for different screen sizes, etc. These artboards may contain similar—but not necessarily identical—artwork, driven by changes necessary for the different formats. For example, a designer uses a graphic illustration application to create artwork for online material on a master artboard. The designer then replicates this artwork, which differs slightly for print material, on a child artboard. The artwork on the master artboard and the artwork on the child artboard can be scaled differently, for example.

The designer may edit the artwork, for example, as part of the creative process or due to changes due to client demands or supervisor requests. But the designer may want the changes made to the artwork on the master artboard to be reflected in the artwork on a child artboard.

Unfortunately, existing solutions for propagating geometric changes made to shapes on one artboard to another artboard require complete or partial manual intervention, which is time consuming and tedious. Some existing solutions may require manually mapping every shape in the master artboard to a corresponding shape in the child artboard. In another example, some existing solutions require manually applying a change to a shape on multiple artboards if the shape differs slightly between the master artboard and a child artboard. In another example, symbols or other shapes with different scales are managed separately by the user, thereby requiring considerable time in propagating changes between artboards. Hence, existing solutions are unable to automatically and efficiently mirror changes made on the master artboard to child artboards.

Accordingly, solutions are needed to automatically propagate changes across artboards.

SUMMARY

Systems and methods are disclosed herein for histogram-based shape mapping for propagating changes across similar shapes in multiple artboards. An image processing application executed by one or more processing devices accesses a first shape to be displayed in a master artboard and a second shape to be displayed in a child artboard. The image processing application computes a first histogram for the first shape and a second histogram for the second shape. The image processing application maps the first shape to the second shape based on a level of similarity between the first and second histograms. The image processing application detects a change to the first shape in the master artboard. The image processing application propagates the change to the second shape in the child artboard based on the first shape being mapped to the second shape.

These illustrative embodiments are mentioned not to limit or define the disclosure, but to provide examples to aid understanding thereof. Additional embodiments are discussed in the Detailed Description, and further description is provided there.

BRIEF DESCRIPTION OF THE FIGURES

Features, embodiments, and advantages of the present disclosure are better understood when the following Detailed Description is read with reference to the accompanying drawings.

DETAILED DESCRIPTION

Figure 1:
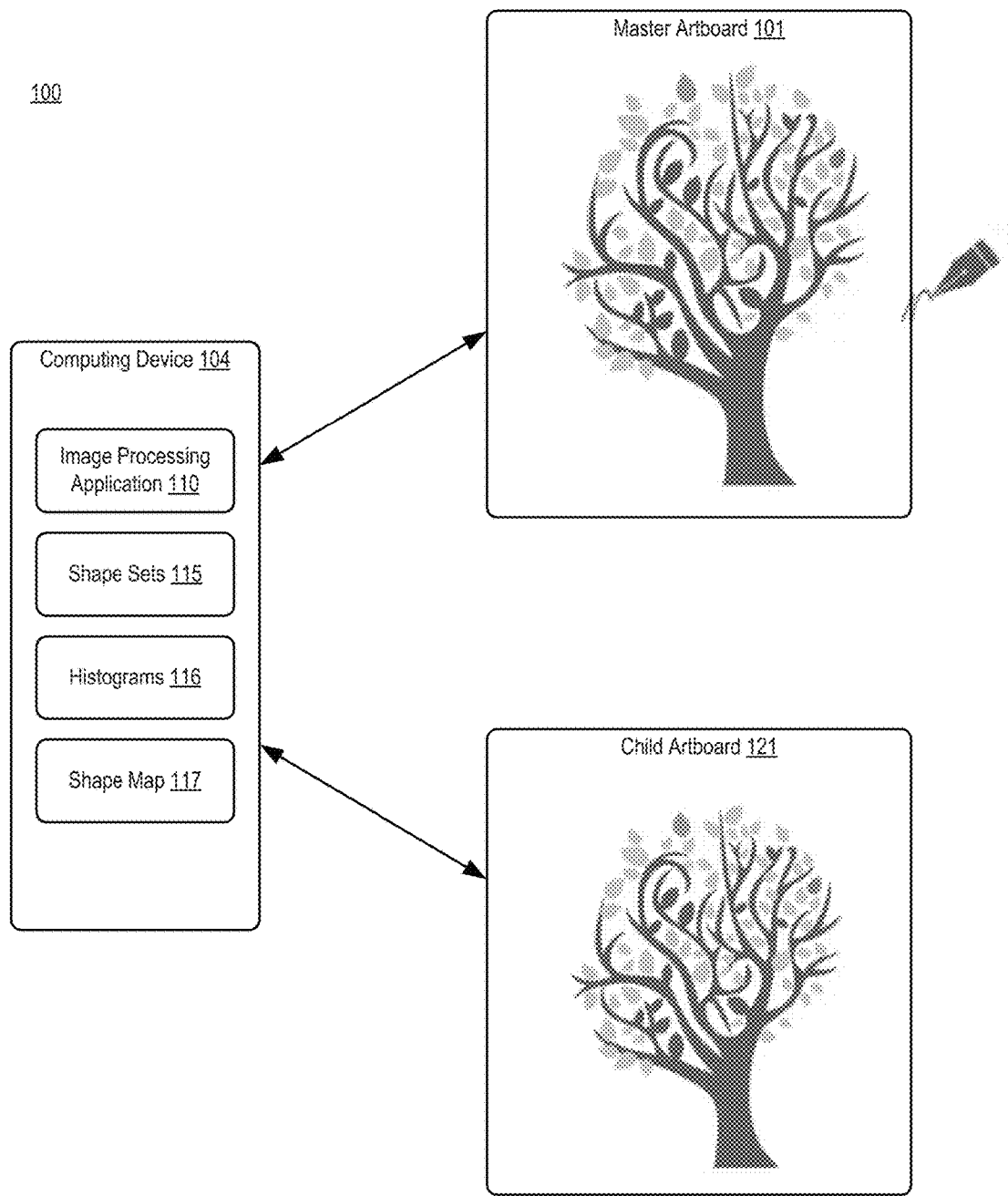
FIG. 1 depicts an example of a computing system used for propagating changes made to shapes on one artboard to another related artboard, according to certain embodiments of the present disclosure.

System and methods described herein use histograms to efficiently and effectively propagate changes between corresponding shapes on different artboards. As discussed above, existing techniques for propagating changes across artboards require manual intervention. Certain embodiments described herein reduce this manual intervention by computing histograms for shapes included in master and child artboards. Each histogram contains spatial characteristics about a shape. This information that is used to determine degrees of similarity among the shapes. The histogram-based similarity is used to match a shape on the master artboard with a similar shape on the child artboard, map the shapes, and automatically propagate changes made to a shape from the master artboard to the mapped shape in the child artboard. Thus, instead of a user manually performing the same change to different versions of a shape across different artboards, a change to the shape on the master artboard is automatically propagated to the corresponding shape on the child artboard.

The following non-limiting example is provided to introduce certain embodiments for propagating changes made to shapes on one artboard to another related artboard. In this example, an image processing application is used by a designer to create artwork on a master artboard. The designer replicates the artwork, with changes to a child artboard. Each artboard includes at least one shape. A shape includes at least one object. In the case that a shape has only one object, the shape is the object. A shape can also be multiple interconnected objects. For example, a designer might draw a tree using different objects. The trunk of the tree and the branches of the tree could be made of multiple interconnected objects. In this example, therefore, the tree trunk and branches are a shape. In contrast, a leaf not connected to the branches or trunk is a separate object. The image processing application analyzes the objects on the master and child artboards (e.g., using a background process) to identify shapes present on the artboards.

With the shapes identified, the image processing application creates a set of histograms from the detected shapes present on each artboard. A histogram includes the number of sampled points of a shape that exist in a certain spatial area. For example, a spatial area could be a bin within a radial mask.

The image processing application uses the histograms for the first and second shape to determine the similarity of the shapes. The image processing application uses the histograms to match a shape on the master artboard with a corresponding shape on the child artboard. For example, the image processing application maps a first shape displayed on the master artboard to a second shape displayed on the child artboard.

The first shape is mapped to the second shape based on a level of similarity between the shapes. For instance, one method of mapping the first shape to the second shape can involve the image processing application using the histograms to calculate a mean vector and a variance vector for each shape. In this example, the mean and variance vectors represent a measure of similarity between the first and second shape.

The image processing application uses the mean and variance vectors to match shapes between the and master and child artboards. For a given pair of shapes in the master and child artboards, the image processing application computes a first Euclidian distance between the master shape's mean vector and the child shape's mean vector as well as a second Euclidian distance between the master shape's variance vector and the child shape's variance vector. If these Euclidian distances are sufficiently small, the image processing application determines that the pair of shapes are a match. The image processing application creates a mapping between the shapes based on the determined match.

The image processing application uses the similarity-based mapping to propagate changes between artboards. For instance, the image processing application receives a change to the first shape on the master artboard, such as a change specified by user input from a designer. The image processing application identifies the type of change made to the first shape (e.g., a movement to the shape from a dragging input, changes to an anchor point, addition of a new path to the shape, changes to the shape's scale or color, etc.). The mapping is used to propagate changes between the master and child artboards. For instance, if the image processing application detects a geometric change to a shape in the master artboard made by the designer, the image processing application applies the change to the shape in the child artboard that corresponds to the modified shape in the master artboard.

Certain Definitions

As used herein, "artboard" is used to refer to an electronic workspace on which a designer creates a drawing electronically. For example, a vector image application may be used to generate an artboard.

As used herein, "master artboard" is used to refer to the primary artboard used by a designer. The master artboard is typically where the designer would make changes not just to the master artboard, but changes intended to be propagated by an image processing application to a child artboard.

As used herein, "child artboard" is used to refer to an artboard that contains similar content to a master artboard and is intended to be updated by the image processing application according to any edits made by the master artboard.

As used herein, "object" is used to refer to an area bounded by a line, the line not intersecting any other lines.

As used herein, "shape" is used to refer to a set of interconnected objects.

Example Computing System

FIG. 1 depicts an example of a computing system used for propagating changes made to shapes on one artboard to another related artboard, according to certain embodiments of the present disclosure. The computing environment 100 includes a computing device 104, a master artboard 101, and a child artboard 121. The image processing application 110 executing on the computing device 104 receives multiple artboards created by a designer. For example, the image processing application 110 receives a master artboard for online content and another, child, artboard for print content. The image processing application 110 receives the changes made to the master artboard 101 and propagates the changes to the child artboard 121. The changes can happen during the design process, for example, in the background.

In this example, the master artboard 101 contains multiple shapes. For example, as shown, master artboard 101 contains a tree with a connected root and branches, and multiple leaves. The connected root and branches, for example, form one shape. The image processing application 110 captures the shapes from the master artboard 101 and the child artboard 121. The image processing application 110 determines the similarity between the a shape on the master artboard 101 and a shape on the child artboard 121 by analyzing characteristics of the shapes. The image processing application 110 maps a shape on the master artboard 101 to a shape on the child artboard 120.

While one child artboard is described with respect to FIG. 1, any number of child artboards can be used. In the case of multiple artboards, the image processing application 110 repeats the process performed with respect to one child artboard with any other child artboards. Multiple child artboards may be different with respect to each other as well as being different with respect to the master artboard. For example, one child artboard could contain for a logo for the top of a web page and another child artboard could contain a smaller version of the same logo for the bottom of the web page.

As further described herein, the image processing application 110 creates and uses data structures such as shape sets 115, histograms 116, and shape map 117, and stores these data structures on the computing device 104. The shape sets 115 contain information about the shapes on the master artboard 101 and the shapes on the child artboard 121. For example, a shape set for the master artboard 101 contains the shapes on the master artboard and information about the paths for each shape.

Each of the histograms 116 indicates, in quantifiable manner, spatial information the corresponding shape, i.e., what the shape looks like. More specifically, a histogram represents the number of sampled points of a shape that exist in a certain spatial area. The histograms 116 allow the image processing application 110 to determine degrees of similarity among the shapes and ultimately match a shape on the master artboard 101 with a shape on the child artboard 121.

The shape map 117 contains the result of the mapping of the shapes. For example, an entry in the shape map 117 that corresponds to the first shape indicates that the first shape matches to a second shape in the child artboard 121 (i.e., that the shapes are similar based on their histograms).

The image processing application 110 derives the shape sets 115 from the master artboard 101 and child artboard 121, the histograms 116 from the shape sets 115, and the shape maps 117 from the histograms 116. More specifically, the image processing application 110 generates one of the shape sets 115 from the master artboard 101 and another of the shape sets 115 from the child artboard 121. Each shape set 115 contains a representation of the shapes in a particular artboard, more specifically, which objects are connected to form a shape and the locations of the objects on the artboard. Each of the shape sets 115 therefore corresponds to a particular artboard.

From each shape set 115, the image processing application 110 samples a number of points on the identified shapes. From the sampled points corresponding to each shape within a shape set 115 for each artboard, the image processing application 110 generates one of the histograms 116. The histograms 116 enable the image processing application 110 to determine the similarity between a shape on the master artboard 101 and a shape on the child artboard 121. The histograms 116 therefore represent characteristics of the shape, such as the frequency of occurrence of sampled points in a particular spatial category. Various methods can be used for sampling and histogram generation, as discussed further herein. The similarity determines the mapping of shapes between artboards. For example, a histogram for a first shape can be compared with a histogram for a second shape.

The image processing application 110 creates the shape map 117 from the sets of histograms 116 for the master artboard 101 and the set of histograms 116 for the child artboard 121. The shape map 117 includes a mapping between a given shape in the master artboard 101 to a corresponding shape in the child artboard 121. The shape map 117 enables the image processing application 110 to identify changes made by the designer to the master artboard 101 and propagate the changes to the child artboard 121.

Figure 2:
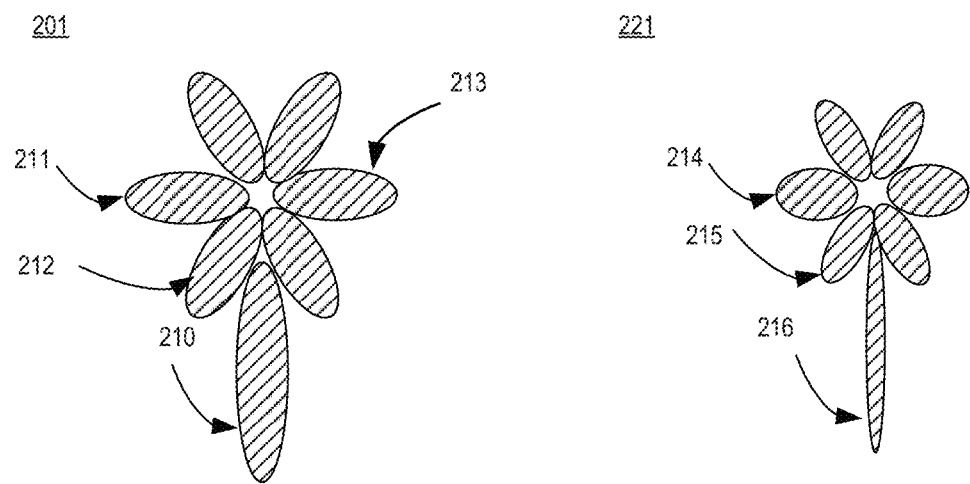
FIG. 2 depicts an example of configuring a master artboard and a child artboard using the system of FIG. 1, according to certain embodiments of the present disclosure.

FIG. 2 depicts an example of configuring a master artboard and a child artboard using the system of FIG. 1, according to certain embodiments of the present disclosure. As shown in FIG. 2, master artboard 201 includes various shapes. Master artboard 201 represents the artboard before the image processing application 110 has received any changes made by the designer.

The child artboard 221 is similar, but not identical, to the master artboard. The contents of the master artboard 201 and child artboard 221 differ. For example, the master artboard 201 includes a first shape 210, which corresponds to second shape 216 in the child artboard 221. But the shapes depicted by master artboard 201 and child artboard 121 are not scaled proportionally. As depicted in FIG. 2, the second shape 216 has a narrower width than first shape 210 while having the same length as first shape 210. Similarly, the shape 214 has been scaled disproportionately to 211 and shape 215 has been scaled disproportionally to shape 212. For example, the designer may have made these differences for a number of reasons such as formatting (e.g., the requirements of print versus online media).

Figure 3:
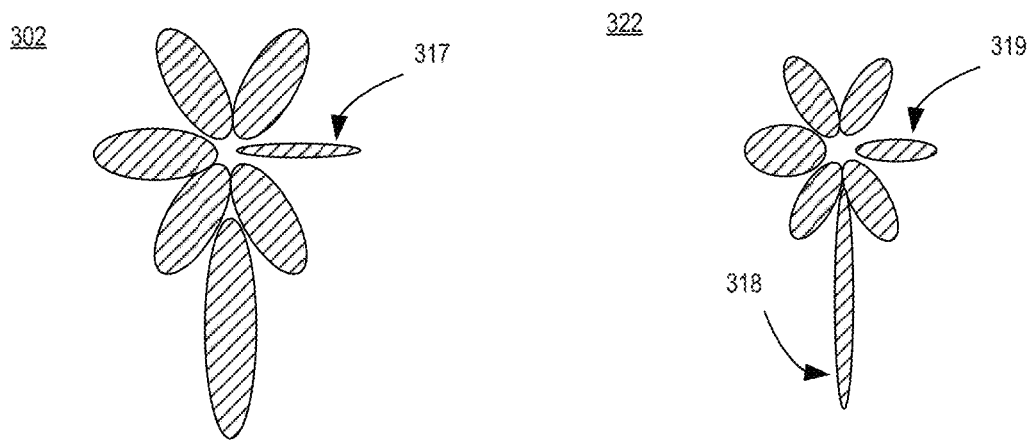
FIG. 3 depicts an example of a process for propagating changes from a master artboard to a child artboard, according to certain embodiments of the present disclosure.

FIG. 3 depicts examples of propagating changes from a master artboard to a child artboard using the system of FIG. 1, according to certain embodiments of the present disclosure. Final master artboard 301 reflects changes made by the designer to master artboard 201. In particular, as shown in FIG. 3, the designer has changed the width of the shape 317.

The image processing application 110 receives the final master artboard 301, analyzes the changes made by the designer, adjusts the changes appropriately and propagates the change to the child artboard 322, as depicted in FIG. 3. For example, the image processing application 110 has changed shape 319, which corresponds to shape 317, in response to the designer's change to shape 317. As discussed herein, the image processing application can detect scaling, movement, changes to paths and segments, and styling changes such as color. A path is has a start point, and end point, and at least one segment. A segment is a Bezier curve that is a part of a shape. A path can have multiple segments.

Figure 4:
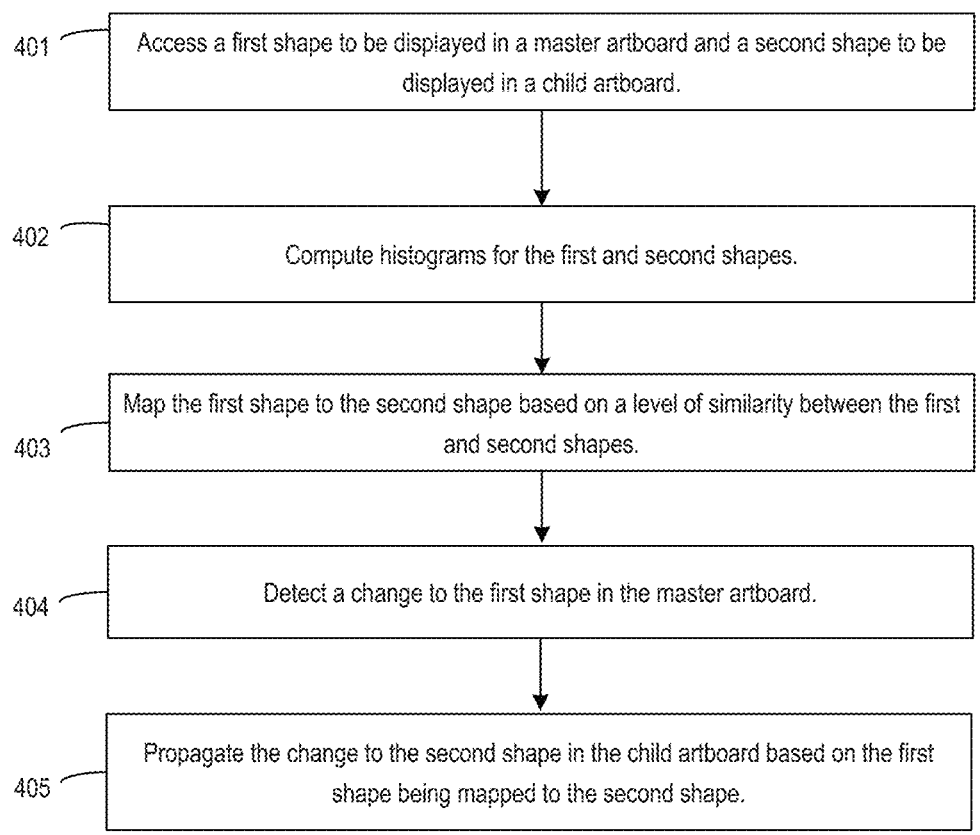
FIG. 4 depicts an example of a process for propagating changes from a master artboard to a child artboard, according to certain embodiments of the present disclosure.

FIG. 4 depicts an example of a process for propagating changes from a master artboard to a child artboard, according to certain embodiments of the present disclosure. In order to map the designer's changes, the image processing application 110 executing on computing device 104 determines the shapes on the master artboard and the child artboard in order to generate a shape set 115 for each artboard. The image processing application 110 samples a set of points on each shape and creates a histogram 116 for each shape. A set of histograms 116 corresponding to a the master artboard 201 and a set of histograms corresponding to the child artboard 221 are used to determine whether a particular shape on the master artboard 201 maps to a shape on the child artboard 221. The image processing application 110 determines a shape map 117 from the sets of histograms 116.

At block 401, method 400 involves accessing a first shape to be displayed in a master artboard and a second shape to be displayed in a child artboard. In some embodiments, an image processing application 110 first analyzes the objects in the master artboard to determine the shapes on the artboard and the objects that form each shape. In other embodiments, the image processing application 110 accesses the shapes from memory.

Figure 5:
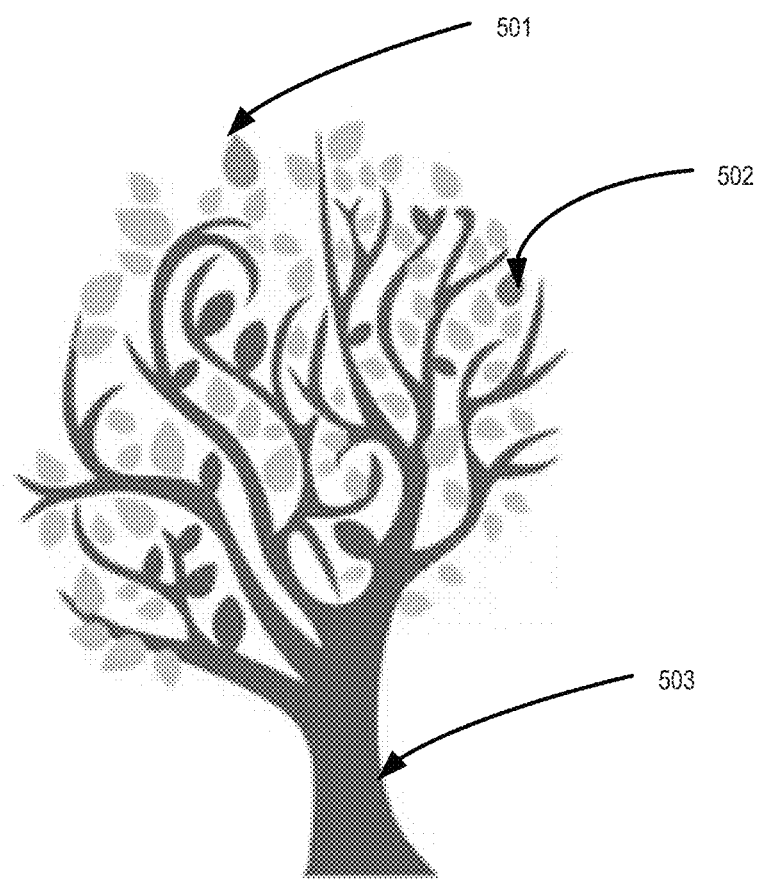
FIG. 5 depicts an example of an artboard with multiple shapes, according to certain embodiments of the present disclosure.

For instance, FIG. 5 depicts an example of an artboard with multiple shapes, according to certain embodiments of the present disclosure. The artboard 500 includes shapes 501, 502, and 503. Shape 503 is a trunk of a tree connected to multiple branches. Because the trunk shape includes multiple interconnected shapes, i.e., the branches and trunk, the trunk and branches form one shape 503. Shape 501 is separate from shapes 502 and 503. Shapes 502 and 503 are separate from each other and each contain only one object. For example, at block 401, method 400 determines shapes 501-503 from artboard 500.

Figure 6:
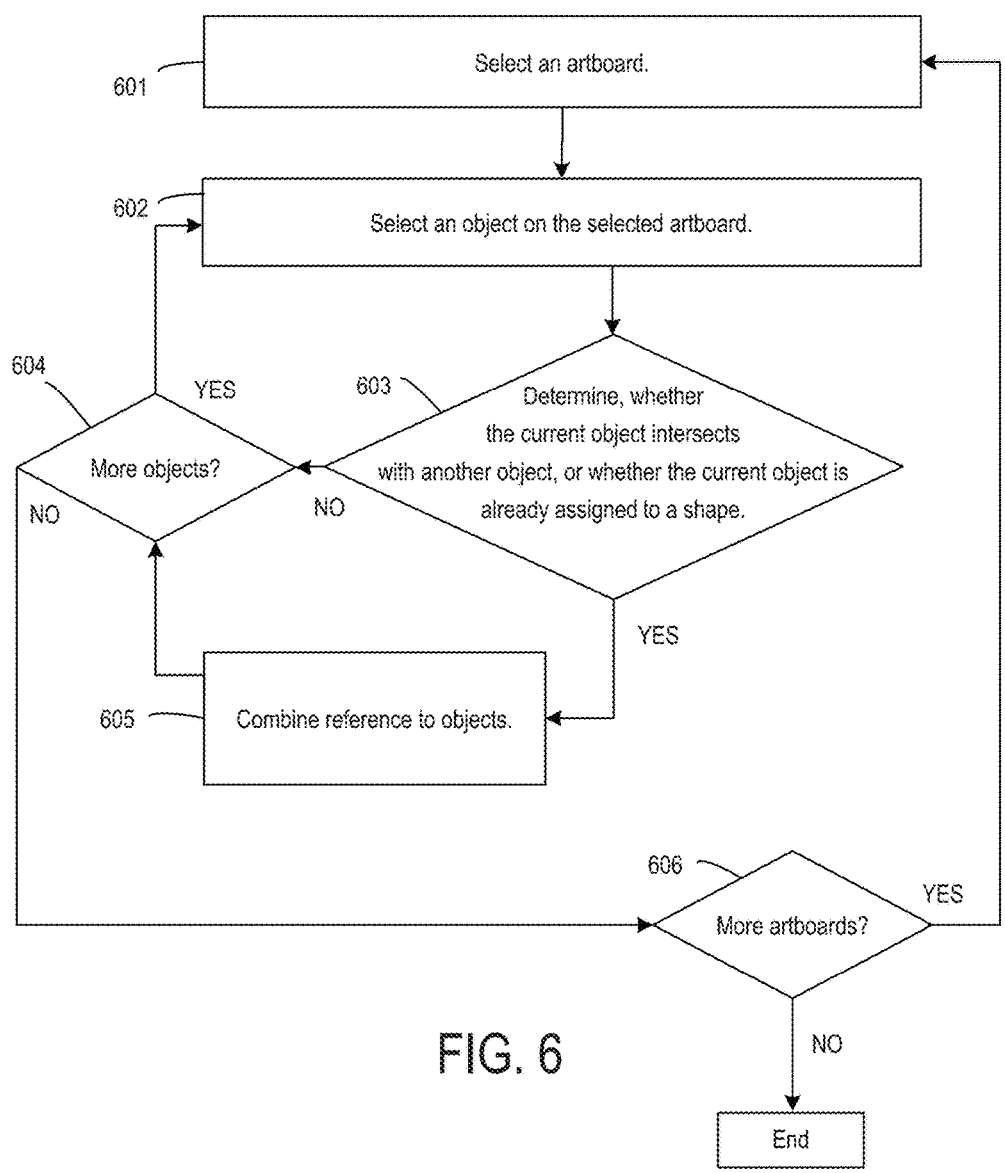
FIG. 6 depicts an example of a method for identifying separate shapes included on an artboard, according to certain embodiments of the present disclosure.

Returning to FIG. 4, at block 401, method 400 analyzes the master artboard 201 and the child artboard 221 to determine the shape information. Different methods can be used to determine the shapes on the artboards. For example, an example method is discussed in relation to FIG. 6. More specifically, FIG. 6 depicts searching through the objects in both the master artboard 201 and the child artboard 221 in order to determine the shapes included in these artboards.

In some embodiments, information embedded in a vector graphics program's file, such as layer information, may be used by the image processing application 110 to improve or speed-up the process of identifying shapes. Regardless of the method used, at block 401, the image processing application 110 generates a shape set 115 for master artboard 101 and child artboard 120.

At block 402, method 400 involves computing histograms for the first and second shapes. The image processing application 110 generates one of the histograms 116 for each shape. To do so, the image processing application 110 samples various points on the first shape and various points on the second shape. In one embodiment, the image processing application 110 uses adaptive sampling. Adaptive sampling samples a number of points according to the length of a segment, of a shape. But other methods can be used. For example, the image processing application 110 can sample points at equal distances on the outside of the shape. But such methods may lead to under-sampling of larger parts, or segments, of a shape while smaller parts are over-sampled. A more detailed illustration of sampling as identified in block 402 is provided with respect to FIG. 7.

The image processing application 110 uses the set of sampled points on a shape to determine a histogram 116 for a shape. The histogram for the first shape and the histogram for the second shape enable the image processing application 110 to determine whether the first and second shapes relate, or map, to each other. The image processing application 110 can use different methods for gathering the sampled points to generate a histogram. A more detailed illustration of sampling and how histograms are calculated as identified in block 402 is provided with respect to FIG. 7.

At block 403, method 400 involves mapping the first shape to the second shape based on a level of similarity between the first and second shapes determined from the histogram. As discussed, the histograms 116 include spatial characteristics of the shapes. A more detailed discussion of generating a histogram is provided with respect to FIG. 8.

Using the histograms 116, the image processing application 110 determines similarity between the first shape to the second shape. For example, in some embodiments, statistical data calculated from the histograms indicates similarity. For example, from a calculated level of similarity, the image processing application 110 determines whether the first and second shape match with each other and creates a shape map 117. The shape map 117 includes, for each shape in the master artboard 101, the best shape match on the child artboard 120. A more detailed discussion of an example method for creating a shape map is provided with respect to FIG. 9. As discussed with respect to FIG. 9, a shape matching function is used to check a shape on the child artboard 221 with a shape on the master artboard 201.

At block 404, method 400 involves detecting a change to the first shape in the master artboard. As discussed with respect to FIG. 1, the image processing application 110 receives a change made by the designer to a first shape in the master artboard. Different changes to the first shape are possible. For example, as discussed with respect to FIGS. 2 and 3, the change can reflect a change to the scale of the first shape. Changes can include the first shape being moved, a changed anchor point, a new path added to the shape, a scaling of the shape, or a changed color.

At block 405, method 400 involves propagating the changes to the second shape in the child artboard based on the first shape being mapped to the second shape. Based on the type of change that the user made to the first shape on the master artboard, the image processing application 110 propagates a change to the second shape on the child artboard 221. For example, the image processing application 110 uses the shape map 117 to determine that the second shape maps to the first shape and to determine the kind of changes necessary to the second shape in order to propagate the changes to the second shape. A more detailed illustration of user changes are identified and propagated as identified in block 405 is provided with respect to FIG. 9. For example, in some embodiments, the shape map 117 includes details about paths and segments for shapes, which helps speed up the process of propagating changes.

Shape Identification

As discussed, in some embodiments, the image processing application 110 determines the shapes on the master artboard 201 and the child artboard 221. For example, the image processing application 110 obtains information about the objects in the master artboard, for example, from a data structure or vector. From the objects, the image processing application 110 determines the shapes in the artboard. In other embodiments, the image processing application 110 may be provided the shape set 115.

FIG. 6 depicts an example of a method for identifying separate shapes included on an artboard, according to certain embodiments of the present disclosure. At block 601, method 600 involves selecting an artboard. As discussed, the image processing application 110 determines the shapes on the master artboard 201, the child artboard 221, and any additional artboards if present.

At block 602, method 600 involves selecting an object on the selected artboard. As discussed, method 600 iterates through the objects on the selected artboard.

At block 603, method 600 involves determining whether the current object intersects another other object, or whether the current object is already assigned to a shape. If two or more objects intersect, the combination of the objects forms a shape. Different methods can be used. For example, the image processing application 110 can combine two objects based on whether the objects are part of the same Bezier curve. If the two objects are part of the same Bezier curve, then method 600 passes to block 605. Additionally, at block 603, if method 600 determines that the current object is already assigned to a shape, then method 600 continues to block 605. Conversely, if at block 603, method 600 determines that the object does not intersect with another object and is not already assigned to another shape, then method 600 passes to block 604.

At block 604, method 600 determines whether the image processing application 110 has iterated through the objects in the artboard, the image processing application 110 has created a shape set for the master artboard. If the image processing application 110 detects more objects, then method 600 passes control back to block 602 and method 600 continues from there. If the image processing application 110 determines that the objects have been checked, then method 600 passes control to block 606.

At block 605, method 600 involves combining references to objects which have been identified as part of the same shape. If a current object intersects with another object, then the image processing application 110 combines the references to the objects to a representation for the shape. Block 605 passes control back to block 604 and method 600 continues from there.

At block 606, method 600 involves checking whether any more artboards are to be analyzed. As discussed, the image processing application 110 determines the shapes on each artboard. If the image processing application 110 determines more artboards exist, then method 600 continues again at block 601. The image processing application 110 similarly analyzes the child artboard, for example. Otherwise, method 600 terminates.

For a large project, iterating through the objects in an artboard can be time-consuming. Other methods can be used to determine the shapes on an artboard more quickly. For example, the vector graphics application such as using layer information present in vector graphics documents, or creating meshes of the art objects.

For example, designers sometimes group objects. For example, groups of objects can make moving multiple objects simpler during the editing process, because the designer need not select the objects before moving them. Similarly, groups can make applying effects, such as color, easier. Grouped objects can be used to identify a shape. The image processing application 110 can use group names present in the layers of the artboards to avoid having to determine which objects are part of a shape.

Additionally, the image processing application 110 can take advantage of other data structures often present in drawing applications. For example, a vector graphics program may use a data structure in which the root node represents the document and the leaf nodes are the groups of objects, i.e., shapes. In such a document, the next level of leaves are the objects. The image processing application 110 can use the groups of objects as shapes to avoid determining shape information.

In some embodiments, the image processing application 110 can create internal mesh data structures of the objects using a Planar Straight Line Graph (PSLG) followed by triangulation. The image processing application 110 creates triangles as a mesh and builds a tree using an algorithm such as Boundary Volume Hierarchy. Each intermediate node represents a collection of leaves that do not collide, therefore each node represents a shape. The nodes from the tree that have leaves, i.e., the nodes that have multiple objects. The image processing application 110 can use these nodes as shapes.

In some embodiments, the image processing application 110 uses additional methods to disambiguate duplicate shapes in an artboard. For example, child artboard 221 may contain multiple shapes which are similar or identical, but a given shape on the master artboard 201 only maps to one of these shapes. The image processing application 110 can use geometric constraint paths to determine which shape on the child artboard 221 to use for a mapping of a given shape on the master artboard 201.

Sampling

Figure 7:
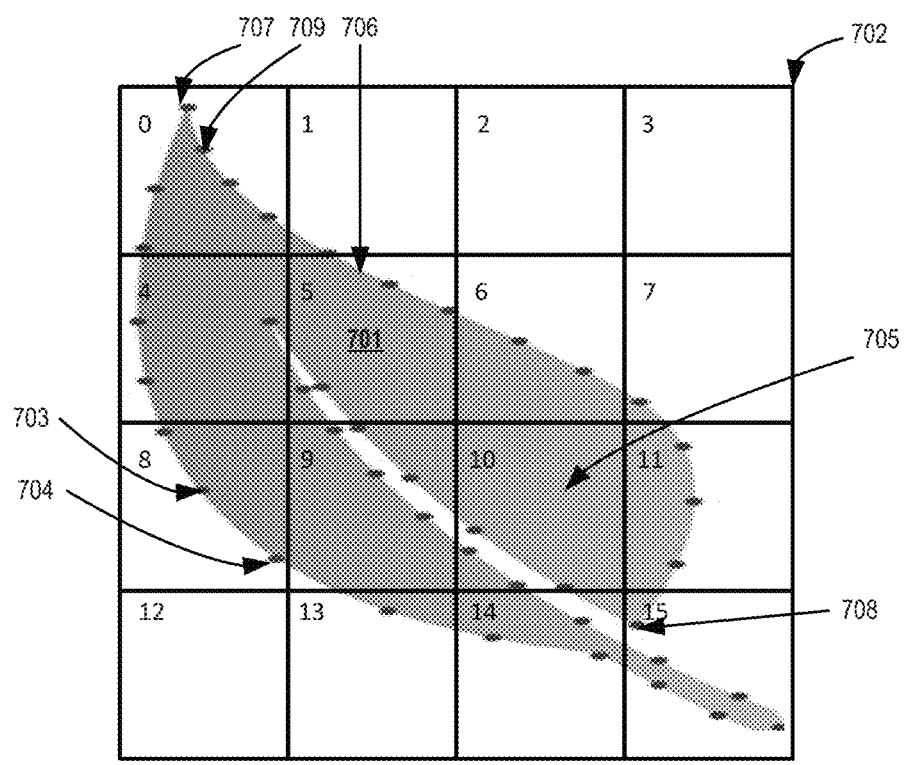
FIG. 7 illustrates an example of normalization and sampling used by the method of FIG. 3, according to certain embodiments of the present disclosure.

In order to model the shape's characteristics, the image processing application 110 samples a number of points on the shape. The sampling process may include a normalization step in which the shape is constrained to a fixed-size square box. The image processing application 110 therefore stretches or reduces the shape as appropriate to fit in the box. FIG. 7 illustrates an example of normalization and sampling used by the method of FIG. 5, according to certain embodiments of the present disclosure.

As can be seen, the image processing application 110 has stretched shape 701, a leaf, to fit within box 702. Box 702 is a square. Because shape 701 is represented in vector form, the normalization is shape-agnostic. Therefore, the shape 701 does not lose any information when resized, even if the resizing is applied differently on the x and y axes. In contrast, a shape represented in image (e.g., bitmap) form would lose information when constrained because the shape could no longer be recreated in its original form. As a result of normalization, the shape 701 is contained within the box 702.

A shape contains or more paths. For example, a shape that is a circle contains only one path. The path is the circumference of the circle. As shown in FIG. 7, a shape may contain multiple paths. Shape 701 contains five paths. For example, path 706 extends from the top left of the leaf at point 707, down to the bottom right to point 708.

Following normalization, the image processing application 110 samples the shape in order to form a representation of the paths on the shape. The image processing application 110 first determines the number of points to sample. The number of points may be fixed or dynamic. Different algorithms and number of points may be used.

Sampling may also be based on the number of paths of a shape or be performed on a per-path basis. For example, each path may be sampled with a fixed number, e.g., 25, points. For path length l, sampling points are separated by 25/l distance on the path.

In further embodiments, sampling may be uniform. For example, the image processing application 110 samples points uniformly, or evenly, over the paths of a shape. For example, for N points, and a total path length of L, each sampled point is located L/N distance from the next sampled point.

Adaptive sampling may also be used. Adaptive sampling samples more frequently in some parts of the shape and less frequently in other parts of the shape. For example, adaptive sampling samples a number of points according to the length of a part, or segment, of a shape. The image processing application 110 has performed adaptive sampling on shape 701. As can be seen, at different parts of the shape, the sampling points are distributed differently. For example, sampled points 703 and 704 are spaced farther apart than sampled points 707 and 709.

Computing Histograms

The image processing application 110 computes one of the histograms 116 for each shape, based on the sampled points from the shapes. The histograms allow the image processing application 110 to determine the similarity of a shape on the child artboard 221 with a shape on the master artboard 201. In order to generate the histogram for a given shape, the image processing application 110 iterates through each sampled point on the shape, applies a mask of some kind to the shape, and counts the number of other sampled points that fall within each category of the mask. Different kinds of masks can be used.

Figure 8:
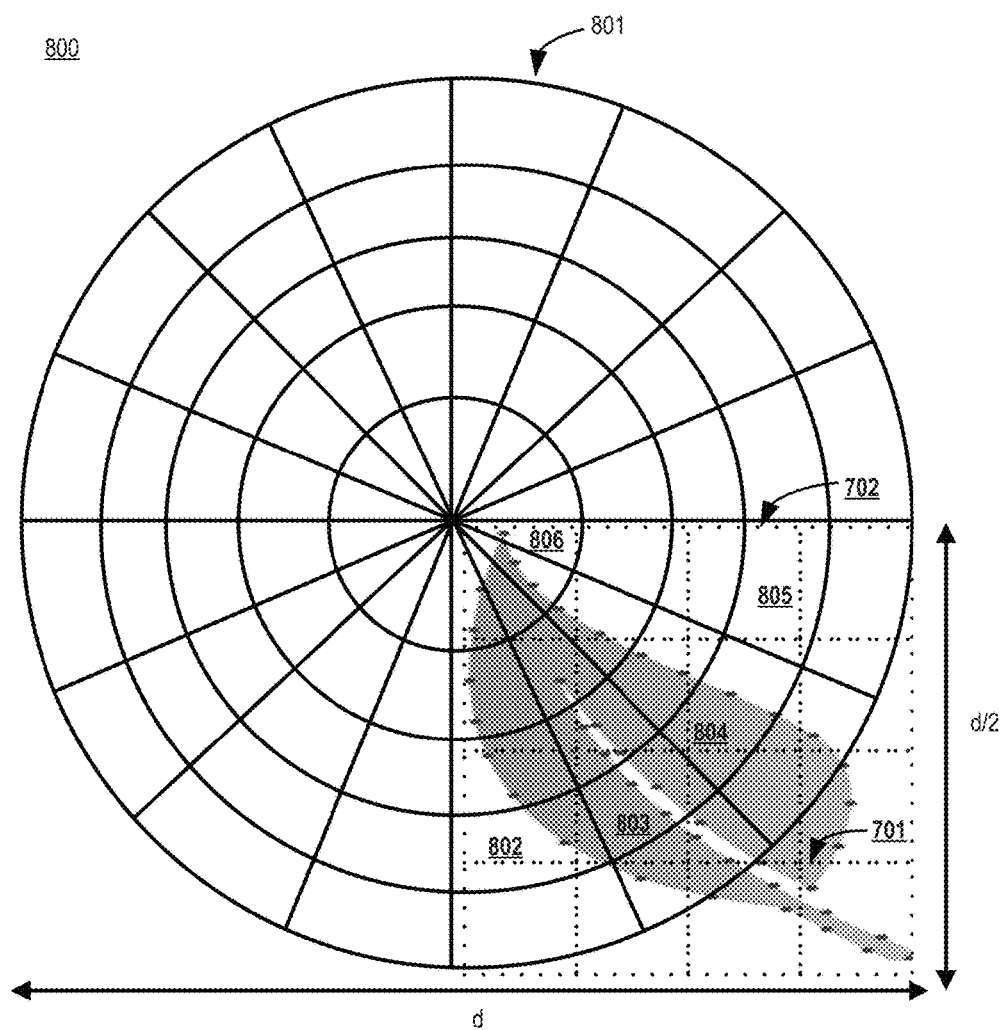
FIG. 8 depicts an example radial mask used to determine a histogram, according to certain embodiments of the present disclosure.

For example, FIG. 8 depicts an example radial mask used to determine a histogram, according to certain embodiments of the present disclosure. FIG. 8 shows histogram example 800. Histogram example 800 shows a radial mask 801 overlaying sampled shape 701. FIG. 8 shows example bins 802-805. For a given radial mask with R rings and B bins per ring, there are a total of R×B bins. For example, FIG. 8 shows 5 rings and 16 bins per ring, for a total of 80 bins.

In FIG. 8, radial mask with diameter d is sized such that the shape and the corresponding grid fit into a square size d/2. Other variations are possible, such as a smaller radial mask or a rectangular mask. In order to generate the histogram, the image processing application 110 overlays the radial mask 801 on top of each sampled point. The image processing application 110 sizes the radial mask 801 appropriately for the normalized area within the box 702, i.e., the radius of the mask is equal to the height and width of the box.

For each sampled point, the image processing application 110 determines the number of other sampled points in each of the R×B bins. For example, the radial mask 801 is located at the top left of the sampled shape 701. As can be seen, bin 802 contains one sampled point, bin 803 contains three sampled points, bin 804 contains two sampled points, and bin 805 does not contain any sampled points. In some embodiments, bin closer to the center of the radial mask, such as bin 806, may be given more weight than points further away from the center of the mask and the current sampled point, such as bin 802. The sampled points in each bin together form a representation of the shape 701. Given R×B bins, if the histogram is represented as a feature vector, the feature vector will have length R×B.

The image processing application 110 moves the radial mask to the next sampled point and proceeds to count, again, the number of other sampled points in each radial bin. As such, for N points, for each sampled point, the histogram contains N−1 points.

In some embodiments, a grid may be used as part of histogram generation. For example, if normalization of the shape is not performed, then the mask that is used for the histogram may be smaller than the shape. In this case, some of the sampled points on the shape may fall outside of the mask and therefore not be represented in the histogram. A grid serves as a method of handling such a case by creating alternative bins, e.g., grid boxes, into which the histogram may place sampled points.

Returning to FIG. 7, box 702 contains a 4×4 grid, but any number of gridlines is possible. In further embodiments, the image processing application 110 can use the grid to improve the performance of generating the histogram by binning only the sampled points in adjacent bins to the bin in which the current point resides. For example, if the image processing application is calculating the number of points in different parts of the shape based on point 709, which is located in grid box 0, then the image processing application 110 can count the number of points in boxes 1-15. In yet other embodiments, the image processing application 110 can chose to only count the sampled points in a subset of the grid boxes, for example boxes 1 and 4, which are adjacent to box 0. Such a method can improve performance.

The image processing application 110 continues by generating a histogram for each shape on each artboard. The image processing application 110 thereby generates a set of histograms 116 for the master artboard 201 and a set of histograms 116 for the child artboard 221.

Determining the Shape Map

Given a set of histograms 116 for each artboard, the image processing application 110 determines the shape map 117. The shape map 117 contains, for each shape on the master artboard 201, a corresponding shape on the child artboard 221. The image processing application 110 uses the histograms to determine similarity between shapes.

Figure 9:
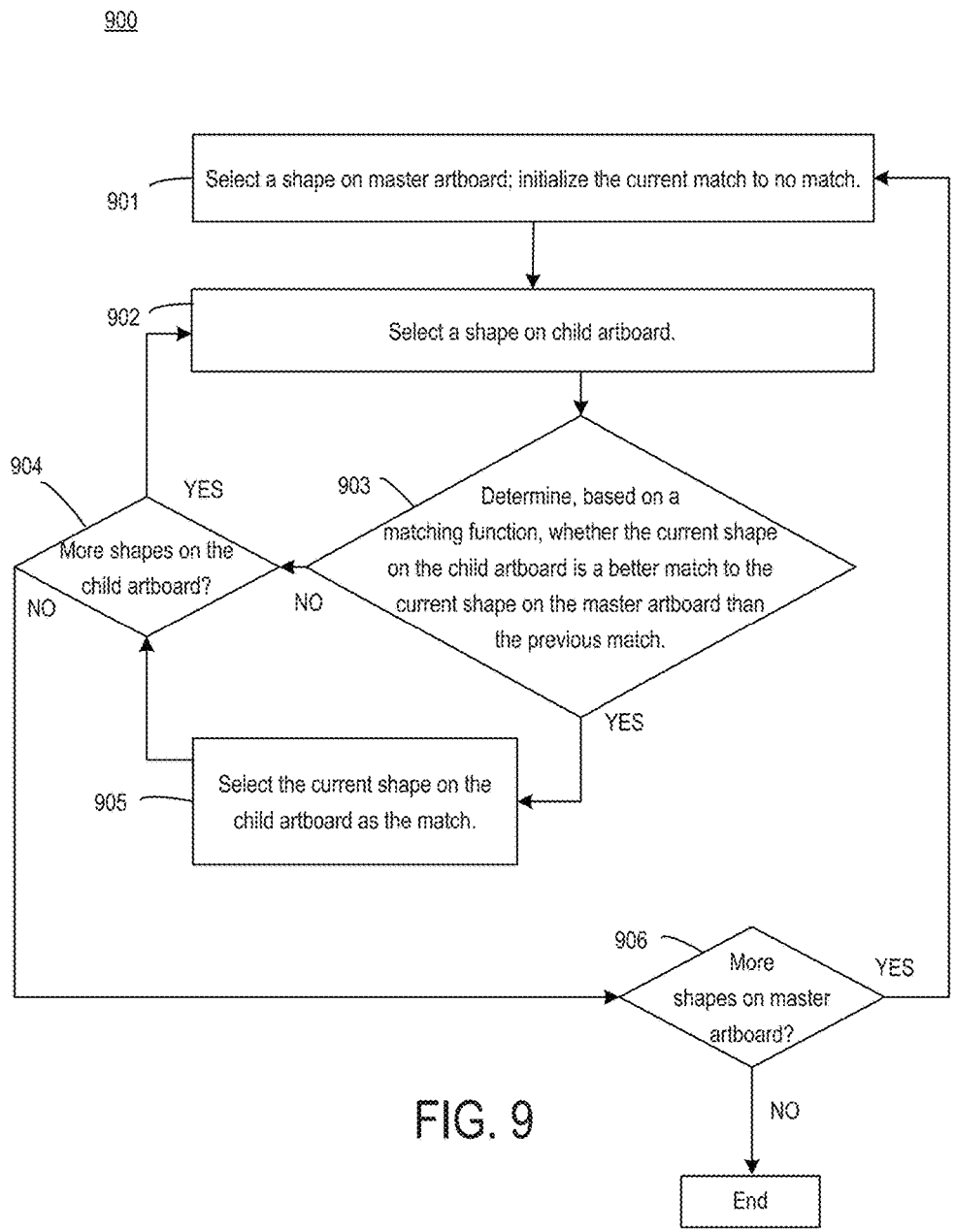
FIG. 9 depicts an example of a process for determining whether two shapes should be matched to each other, according to certain embodiments of the present disclosure.

FIG. 9 depicts an example of a process for determining whether two shapes should be matched to each other, according to certain embodiments of the present disclosure. The image processing application 110 completes the shape map by using a method such as method 900.

At block 901, method 900 involves selecting a shape on the master artboard and initializing the current match as no match found. The current match is later replaced with the best match as method 900 continues.

At block 902, method 900 involves selecting a shape on the child artboard. Accordingly, for a given shape on the master artboard 201, the image processing application 110 checks each shape on the child artboard 221 for the best match.

At block 903, method 900 involves determining, based on a matching function, whether the current shape on the child artboard is a better match to the current shape on the master artboard than the previous match. The image processing application 110 may use different functions to determine a match. For example, image processing application 110 may use feature vectors generated from the histogram of the shapes.

For example, for a given shape on the master artboard 201 and a given shape on the child artboard 221, the image processing application 110 can calculate statistics from the feature vectors for each shape. In some embodiments, the image processing application 110 uses mean and variance vectors. For example, for a first shape on the master artboard 201, the image processing application 110 calculates a mean vector, e.g., v0, of the histograms of the points of the shape. The image processing application 110 calculates a variance vector, e.g., v1, of the histograms of the points on the shape.

The image processing application 110 calculates the mean vector v0 and variance vector v1 for a second shape being evaluated on the child artboard 221. The image processing application 110 then compares the mean and variance vectors for the first and second shapes. For example, the image processing application 110 can calculate the Euclidian distance between the first and second shapes using the mean and variance vectors. The image processing application 110 can use the Euclidian distance as the matching function. If the current pair of shapes has a lower Euclidian distance than the previous match, then the current pair is a better match and is used.

In other embodiments, point matching may be used as the matching function. For example, if a sampled shape on the master artboard 201 is determined to have a threshold level, e.g., 80%, of the same points as the a sampled shape on the child artboard 221, then the image processing application 110 considers the two shapes a match and the mapping is added to the shape map 117.

In yet further embodiments, the image processing application may match two shapes on a segment-by-segment basis. For example, if a shape on the master artboard 201 has a threshold number of segments in common with a shape on the child artboard 221, then the image processing application 110 considers the two shapes to be a match and the mapping is added to shape map 117.

The image processing application may also construct a path-level mapping in addition to or instead of a shape-level mapping. As discussed in more detail herein, in order to identify and propagate changes made to a first shape to a second shape, the image processing application may identify the particular path changed by the designer. For example, the image processing application 110 may map each path within a first shape to the corresponding path in the second shape. The image processing application 110 may maintain this path level mapping in the same data structure, e.g., the shape map 117, or in a different data structure.

At block 904, if the current shape on the child artboard is a better match than the previous best match, then method 900 passes control to 905. At the conclusion of method 900, the shape on the child artboard that is the best match is mapped to the shape on the master artboard.

At block 904, method 900 involves checking whether there are more shapes on the child artboard. If there are more shapes, then method 900 passes control back to 902 and the process continues with the next shape on the child artboard.

If there are not any more shapes on the child artboard, i.e., the shapes have been checked, then method 900 passes control to block 906.

At block 905, method 900 involves selecting the current shape on the child artboard as the match. At 905, the image processing application 110 adjusts the best match to correspond to the current shape on the child artboard.

At block 906, method 900 involves determining whether there are more shapes on the master artboard. Method 900 continues through the remaining shapes on the master artboard until the master artboard has evaluated each shape on the master artboard.

With the shape map 117 completed, the image processing application 110 is ready to identify any changes made by the designer to the master artboard.

Identifying Changes Made by Designer

Figure 10:
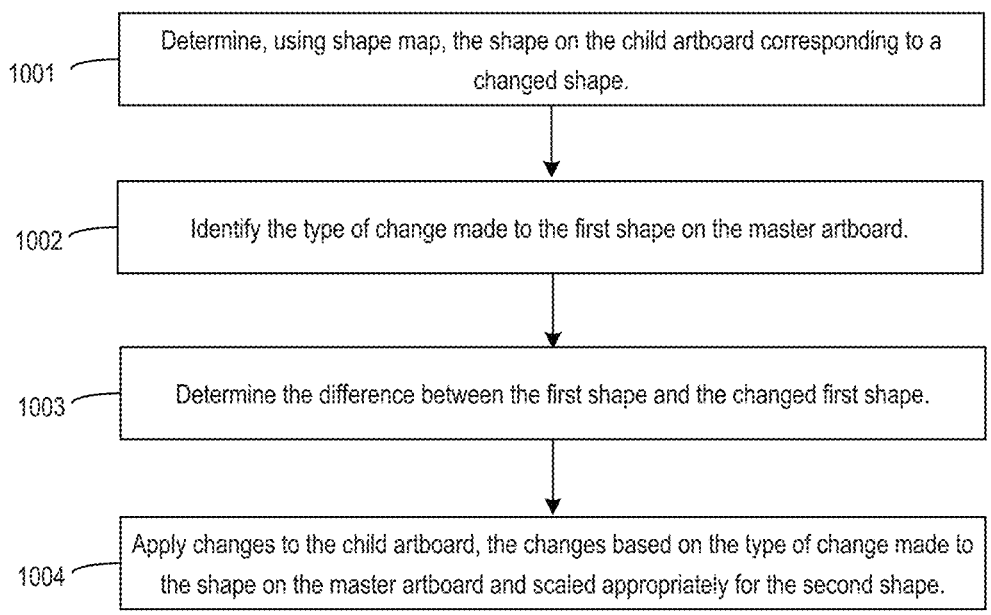
FIG. 10 depicts an example of a process for identifying changes made to a master artboard and propagating the identified changes to the child artboard, according to certain embodiments of the present disclosure.

FIG. 10 depicts an example of a process for identifying changes made to a master artboard and propagating the identified changes to the child artboard, according to certain embodiments of the present disclosure. More specifically, the image processing application 110 detects the changes made by the designer to the first shape on the master artboard 201 and applies those changes to the second shape on the child artboard 121.

At block 1001, method 1000 involves determining, using a shape map, the shape on the child artboard corresponding to a changed shape on the master artboard. The image processing application 110 may use different methods. For example, the image processing application 110 may identify the shape by obtaining an internal name of the object containing a path selected by the designer for editing.

At block 1002, method 1000 involves identifying the type of change made to the first shape on the master artboard. The image processing application 110 may receive different kinds of changes to the shapes made by the designer. For example, the edits received by the image processing application 110 may be a drag, an anchor point update, a style update, color update, or an addition of a new object to the shape.

In an example, the image processing application 110 detects that the designer has moved the first shape. In response, the image processing application 110 moves the second shape on the child artboard 121 accordingly, taking into consideration the relative scale of the first and second shape in both horizontal and vertical dimensions.

In a further example, the image processing application 110 detects that the designer has changed a property of the first shape, such as style, color, shading, etc. In this case, the image processing application 110 applies the changed property to the second shape on the child artboard 221. Because the second shape is isometric in nature with respect to the first shape, the image processing application 110 can handle a mismatched number of segments or paths between the first and second shape.

At block 1003, method 1000 involves determining the difference between the first shape and the changed first shape. The image processing application 110 analyzes the paths in the changed first shape and determines where, exactly, the change is located on the shape. The image processing application 110 computes a difference between the original first shape and the changed first shape. The difference may be based on the number and location of sampled points on the first shape relative to the changed first shape. For example, the image processing application 110 calculates the difference between sets of points on the first shape and second shape, in both the horizontal and vertical dimensions.

The image processing application 110 may also operate on a segment or path level. For example, the image processing application 110 may determine the precise path or segment changed on the first shape and the degree to which the first shape was changed.

At block 1004, method 1000 involves applying changes to the child artboard, the changes based on the type of change made to the shape on the master artboard and scaled appropriately for the second shape. The image processing application 110 applies the difference to the second shape on the child artboard 121, changing the second shape in the same manner as the designer changed the first shape. As discussed, the first and second shapes may have different scales in one or both dimensions. As such, the image processing application 110 scales the changes made to the first shape appropriately for the second shape. The image processing application 110 can also apply changes such as a change to the curve of the first shape, change to the color of the first shape, or change to the style of the first shape.

Computing System

Figure 11:
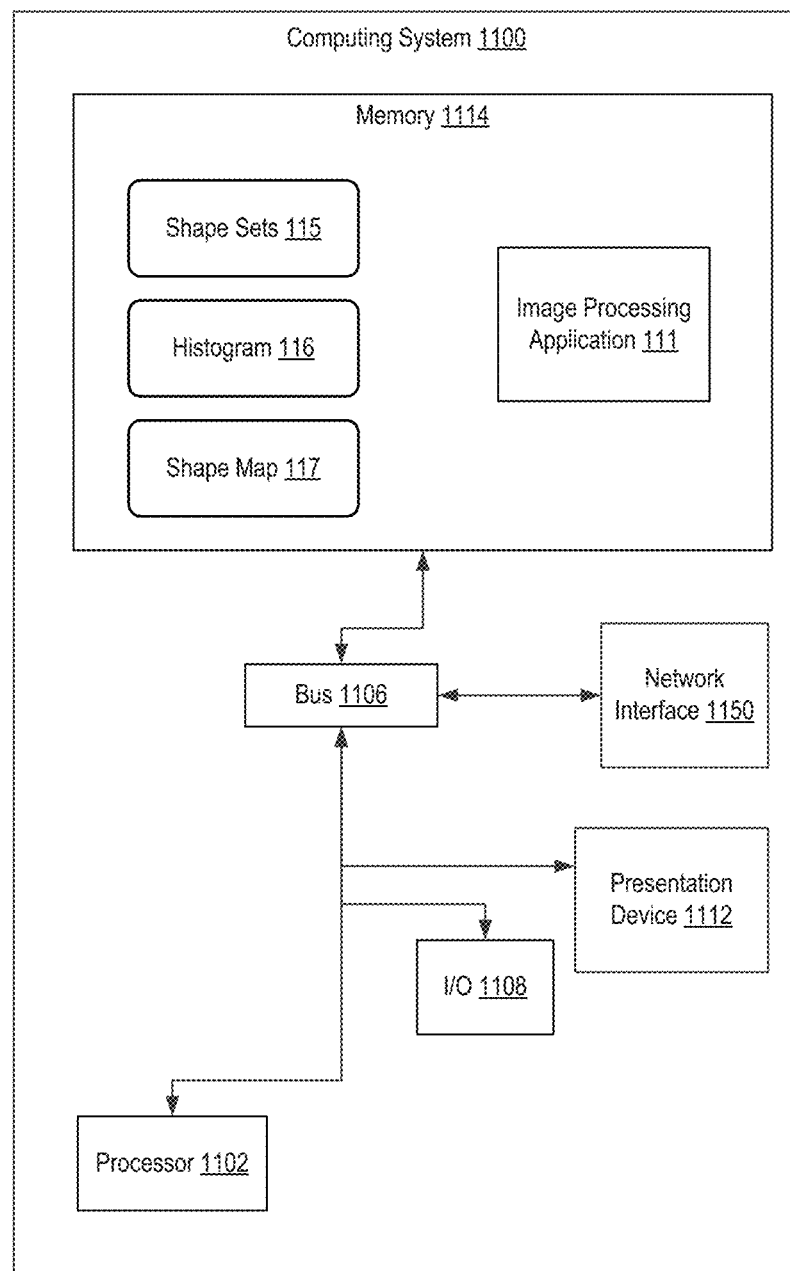
FIG. 11 depicts an example of a computing system for propagating similar shape changes across related artboards, according to certain embodiments of the present disclosure.

FIG. 11 depicts an example of a computing system for propagating similar shape changes across related artboards, according to certain embodiments of the present disclosure. Some of the components of the computing system 1100 can belong to the computing device 104 of FIG. 1. For example, the image processing application 110 may operate on the computing system 1100. The computing system 1100 includes one or more processors 1102 communicatively coupled to one or more memory devices 1114. The processor 1102 executes computer-executable program code, which can be in the form of non-transitory computer-executable instructions, stored in the memory device 1114, accesses information stored in the memory device 1114, or both. Examples of the processor 1102 include a microprocessor, an application-specific integrated circuit ("ASIC"), a field-programmable gate array ("FPGA"), or any other suitable processing device. The processor 1102 can include any number of processing devices, including one.

The memory device 1114 includes any suitable computer-readable medium such as electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C#, Visual Basic, Java, Python, Perl, JavaScript, and ActionScript.

The computing system 1100 may also include a number of external or internal devices such as input or output devices. For example, the computing system 1100 is shown with an input/output ("I/O") interface 1108 that can receive input from input devices or provide output to output devices. A bus 1106 can also be included in the computing system 1100. The bus 1106 can communicatively couple one or more components of the computing system 1100 and allow for communication between such components.

The computing system 1100 executes program code that configures the processor 1102 to perform one or more of the operations described above with respect to FIGS. 1-10. The program code of the image processing application 110, which can be in the form of non-transitory computer-executable instructions, can be resident in the memory device 1114 or any suitable computer-readable medium and can be executed by the processor 1102 or any other one or more suitable processor. Execution of such program code configures or causes the processor(s) to perform the operations described herein with respect to the computing device 104. In additional or alternative embodiments, the program code described above can be stored in one or more memory devices accessible by the computing system 1100 from a remote storage device via a data network. The computing device 104 and any processes can use the memory device 1114. The memory device 1114 can store, for example, additional programs, or data such shape sets 115, histograms 116, or a shape map 117, used by the applications executing on the processor 1102 such as the image processing application 110.

The computing system 1100 also includes at least one network interface 1110. The network interface 1110 includes any device or group of devices suitable for establishing a wired or wireless data connection to one or more data networks. Non-limiting examples of the network interface 1110 include an Ethernet network adapter, a modem, and/or the like. The computing system 1100 is able to communicate with one or more other computing devices or computer-readable data sources via a data network using the network interface 1110.

The computing system 1100 includes a presentation device 1112. A presentation device 1112 can include any device or group of devices suitable for providing visual, auditory, or other suitable sensory output. Non-limiting examples of the presentation device 1112 include a monitor, a speaker, a separate mobile computing device, etc.

GENERAL CONSIDERATIONS

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multi-purpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes poses of example rather than limitation, and does not preclude the inclusion of such modifications, variations, and/or additions to the present subject matter as would be readily apparent to one of ordinary skill in the art.

The invention claimed is:

1. A method of histogram-based shape mapping for propagating changes across similar shapes in multiple artboards, the method comprising performing, by an image processing application executed by one or more processing devices, operations comprising:
   accessing a first shape to be displayed in a master artboard and a second shape to be displayed in a child artboard;
   computing a first histogram for the first shape and a second histogram for the second shape;
   mapping the first shape to the second shape based on a level of similarity between the first and second histograms;
   detecting a change to the first shape in the master artboard; and
   propagating the change to the second shape in the child artboard based on the first shape being mapped to the second shape.

2. The method of claim 1, further comprising:
   scaling the first shape to fit into a grid of a predetermined size;
   scaling the second shape to fit into the grid;
   wherein computing the first histogram further comprises sampling a first set of points on the first shape according to a mask, and computing the second histogram further comprises sampling a second set of points on the second shape according to the mask; and
   wherein determining the level of similarity further comprises comparing the first set of points with the second set of points.

3. The method of claim 2, wherein the grid is a square with sides having a length, the mask is a radial mask comprising a radius, and the radius is equal to the length.

4. The method of claim 2, wherein:
   the first shape comprises a first path comprising a first length,
   the second shape comprises a second path comprising a second length,
   the first set of points comprises a first number of points, the first number of points proportional to the first length; and the second set of points comprises a second number of points, the second number of points proportional to the second length.

5. The method of claim 2, further comprising:
generating a first set of vectors, each vector representing, for a given sampled point on the first shape, a number of other sampled points located in each bin of the first histogram;
generating a second set of vectors, each vector representing, for a given sampled point on the first shape, a number of other sampled points located in each bin of the second histogram;
generating a first mean vector and first variance vector from the first set of vectors;
generating a second mean vector and second variance vector from the second set of vectors; and
wherein mapping the first shape to the second shape further comprises comparing the first and second mean vectors with the first and second variance vectors.

6. The method of claim 1, wherein mapping the first shape to the second shape further comprises determining that a threshold number of points in the first and second histograms are identical.

7. The method of claim 1, wherein the detecting the change to the first shape comprises detecting a change to a first scaling of the first shape, and wherein propagating the change further comprises:
determining a second scaling of the second shape, the second scaling based on the first scaling, the first histogram and the second histogram, and
applying the second scaling to the second shape.

8. The method of claim 1, wherein accessing the first and second shape further comprises:
receiving a first set of objects to be displayed on the master artboard;
receiving a second set of objects to be displayed on the child artboard;
determining, from the first set of objects, the first shape, the first shape comprising at least one object; and
determining, from the second set of objects, the second shape, the second shape comprising at least one object.

9. A system comprising:
a non-transitory computer-readable medium storing computer program instructions for categorizing text regions of an electronic document into document object types; and
a processing device communicatively coupled to the non-transitory computer-readable medium for executing the computer program instructions, wherein executing the computer program instructions configures the processing device to perform operations comprising:
accessing a first shape to be displayed in a master artboard and a second shape to be displayed in a child artboard;
computing a first histogram for the first shape and a second histogram for the second shape;
mapping the first shape to the second shape based on a level of similarity between the first and second histograms;
detecting a change to the first shape in the master artboard; and
propagating the change to the second shape in the child artboard based on the first shape being mapped to the second shape.

10. The system of claim 9, wherein executing the computer program instructions further configures the processing device to perform operations comprising:
scaling the first shape to fit into an area of a predetermined size;
scaling the second shape to fit into the area;
wherein computing the first histogram further comprises sampling a first set of points on the first shape according to a mask, and computing the second histogram further comprises sampling a second set of points on the second shape according to the mask; and
wherein determining the level of similarity further comprises comparing the first set of points with the second set of points.

11. The system of claim 10, wherein the area is a square with sides having a length, the mask is a radial mask comprising a radius, and the radius is equal to the length.

12. The system of claim 10, wherein:
the first shape comprises a first path comprising a first length,
the second shape comprises a second path comprising a second length,
the first set of points comprises a first number of points, the first number of points proportional to the first length; and
the second set of points comprises a second number of points, the second number of points proportional to the second length.

13. The system of claim 10, wherein executing the computer program instructions further configures the processing device to perform operations comprising:
generating a first set of vectors, each vector representing, for a given sampled point on the first shape, a number of other sampled points located in each bin of the first histogram;
generating a second set of vectors, each vector representing, for a given sampled point on the first shape, a number of other sampled points located in each bin of the second histogram;
generating a first mean vector and first variance vector from the first set of vectors;
generating a second mean vector and second variance vector from the second set of vectors; and
wherein mapping the first shape to the second shape further comprises comparing the first mean vector with the second mean vector and the first variance vector with the second variance vector.

14. The system of claim 9, wherein mapping the first shape to the second shape further comprises determining that a threshold number of points in the first and second histograms are identical.

15. A non-transitory computer-readable storage medium storing computer program instructions, wherein when executed by a processing device, wherein the computer program instructions cause the processing device to perform operations comprising:
accessing a first shape to be displayed in a master artboard and a second shape to be displayed in a child artboard;
computing a first histogram for the first shape and a second histogram for the second shape;
mapping the first shape to the second shape based on a level of similarity between the first and second histograms;
detecting a change to the first shape in the master artboard; and
propagating the change to the second shape in the child artboard based on the first shape being mapped to the second shape.

16. The non-transitory computer-readable storage medium of claim 15, wherein executing the computer program instructions further cause the processing device to perform operations comprising:

scaling the first shape to fit into a area of a predetermined size;

scaling the second shape to fit into the area;

wherein computing the first histogram further comprises sampling a first set of points on the first shape according to a mask, and computing the second histogram further comprises sampling a second set of points on the second shape according to the mask; and wherein determining the level of similarity further comprises comparing the first set of points with the second set of points.

17. The non-transitory computer-readable storage medium of claim 16, wherein the area is a square with sides having a length, the mask is a radial mask comprising a radius, and the radius is equal to the length.

18. The non-transitory computer-readable storage medium of claim 16, wherein:

the first shape comprises a first path comprising a first length, the second shape comprises a second path comprising a second length, the first set of points comprises a first number of points, the first number of points proportional to the first length; and the second set of points comprises a second number of points, the second number of points proportional to the second length.

19. The non-transitory computer-readable storage medium of claim 16, wherein executing the computer program instructions further causes the processing device to perform operations comprising:

generating a first set of vectors, each vector representing, for a given sampled point on the first shape, a number of other sampled points located in each bin of the first histogram;

generating a second set of vectors, each vector representing, for a given sampled point on the first shape, a number of other sampled points located in each bin of the second histogram;

generating a first mean and first variance vector from the first set of vectors;

generating a second mean and second variance vector from the second set of vectors; and wherein mapping the first shape to the second shape further comprises comparing the first and second mean vectors with the first and second variance vectors.

20. The non-transitory computer-readable storage medium of claim 15, wherein mapping the first shape to the second shape further comprises determining that a threshold number of points in the first and second histograms are identical.

* * * * *